(12) United States Patent
Xu

(10) Patent No.: US 9,886,101 B2
(45) Date of Patent: Feb. 6, 2018

(54) INFORMATION PROCESSING METHOD AND ELECTRONIC DEVICE

(71) Applicant: Lenovo (Beijing) Co., Ltd., Beijing (CN)

(72) Inventor: Ben Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 113 days.

(21) Appl. No.: 14/713,796

(22) Filed: May 15, 2015

(65) Prior Publication Data

US 2016/0188002 A1    Jun. 30, 2016

(30) Foreign Application Priority Data

Dec. 29, 2014    (CN) .......................... 2014 1 0849298

(51) Int. Cl.
*G06F 3/0346* (2013.01)
*G09G 5/00* (2006.01)
*G06F 3/0487* (2013.01)

(52) U.S. Cl.
CPC .......... *G06F 3/0346* (2013.01); *G06F 3/0487* (2013.01)

(58) Field of Classification Search
None
See application file for complete search history.

(56) References Cited

U.S. PATENT DOCUMENTS

| | | | |
|---|---|---|---|
| 2003/0098863 A1 | 5/2003 | Fujita et al. | |
| 2013/0265221 A1* | 10/2013 | Lee | G06F 3/01 345/156 |
| 2013/0335311 A1* | 12/2013 | Kim | G06F 3/01 345/156 |
| 2014/0009407 A1 | 1/2014 | Kim | |
| 2014/0118317 A1* | 5/2014 | Song | G06F 1/1652 345/204 |
| 2015/0338882 A1* | 11/2015 | Yun | G06F 3/04886 345/173 |
| 2015/0338888 A1* | 11/2015 | Kim | G06F 1/1677 345/156 |
| 2016/0048201 A1 | 2/2016 | Xu | |
| 2016/0085319 A1* | 3/2016 | Kim | G06F 3/0346 345/156 |

FOREIGN PATENT DOCUMENTS

| | | |
|---|---|---|
| CN | 102707861 A | 10/2012 |
| CN | 104182141 A | 12/2014 |

OTHER PUBLICATIONS

First Chinese Office Action regarding Application No. 201410849298.3 dated Feb. 16, 2017.

* cited by examiner

*Primary Examiner* — Joseph Haley
*Assistant Examiner* — Emily Frank
(74) *Attorney, Agent, or Firm* — Harness, Dickey & Pierce, P.L.C.

(57) ABSTRACT

An information processing method and an electronic device are provided. The method is applied to an electronic device having flexible display which is capable of N display surfaces, the method includes: obtaining N posture parameters of the N display surfaces; obtaining an object attribute of an i-th display object among M display objects to be displayed, where M≥1 and i is an integer inclusively ranging from 1 to M; determining a display surface for displaying the i-th display object from the N display surfaces, based on the N posture parameters and the object attribute; and displaying the i-th display object on the determined display surface.

12 Claims, 4 Drawing Sheets

INFORMATION PROCESSING METHOD AND ELECTRONIC DEVICE

CROSS-REFERENCE TO RELATED APPLICATION

The present application claims the benefit of priority to Chinese patent application No. 201410849298.3, titled "INFORMATION PROCESSING METHOD AND ELECTRONIC DEVICE", filed with the State Intellectual Property Office of the PRC on Dec. 29, 2014, which is incorporated herein by reference in its entirety.

FIELD

The disclosure relates to the field of electronics technology, and in particular, to an information processing method and an electronic device.

BACKGROUND

With the rapid development of the electronics technology, more and more electronic devices are used in life and work of human beings. The electronic devices provide great convenience for people. The flexible display is a new device, which may be bent, deformed and even folded to form a polyhedron, when being applied with an external force. The flexible display is applied in a few electronic devices for outputting information.

However, presently application of the flexible display in the electronic device is limited to one display surface, in other words, all display objects are output in the whole display region of the flexible display, and the display mode may not be adjusted no matter whether the flexible display is bent or not.

Hence, in the case that the flexible display is bent to present multiple display surfaces, there is a technical problem in the conventional technology that different objects can not be displayed on the multiple display surfaces.

SUMMARY

An information processing method and an electronic device are provided in the disclosure, to solve a technical problem in the conventional technology that different objects can not be displayed on multiple display surfaces of a flexible display, and a display surface for displaying a display object is determined based on posture parameters of the display surfaces and an attribute of the display object.

In an aspect, an information processing method is provided in the disclosure, which is applicable to an electronic device having a flexible display, where the flexible display is capable of having N display surfaces, N is an integer and N≥2, and the method includes:

obtaining N posture parameters of the N display surfaces;

obtaining an object attribute of an i-th display object among M display objects to be displayed, where M is an integer and M≥1, and i is an integer inclusively ranging from 1 to M;

determining a display surface for displaying the i-th display object from the N display surfaces, based on the N posture parameters and the object attribute; and displaying the i-th display object on the determined display surface.

Optionally, the determining a display surface for displaying the i-th display object from the N display surfaces, based on the N posture parameters and the object attribute may include:

determining, based on the object attribute, an i-th display priority of the i-th display object;

determining, based on the N posture parameters, N effective display areas of the N display surfaces observed by a user from a first visual angle at a first observation position;

obtaining, based on the N effective display areas, a first order for arranging the N display surfaces; where an a-th display surface having a maximum effective display area of the N effective display areas is arranged at a first place of the first order and a b-th display surface having a minimum effective display area of the N effective display areas is arranged at an N-th place of the first order; and determining, based on a correspondence between display priorities and the first order, a j-th display surface corresponding to the i-th display priority as the display surface for displaying the i-th display object, where j is an integer inclusively ranging from 1 to N.

Optionally, the determining, based on the object attribute, an i-th display priority of the i-th display object may include:

determining the i-th display priority based on an i-th object type of the i-th display object, in the case that at least two display objects of the M display objects have different object types; or determining the i-th display priority based on display parameters in object attributes of the M display objects, in the case that the M display objects have a same object type.

Optionally, the determining, based on the correspondence between display priorities and the first order, the j-th display surface corresponding to the i-th display priority as the display surface for displaying the i-th display object may include:

determining to display the i-th display object on the j-th display surface, where the j-th display surface is arranged at a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N−j display surfaces which are arranged at a (j+1)-th place to an N-th place of the first order, where P and Q are integers.

Optionally, after the determining to display the i-th display object on the j-th display surface, the method may further include:

determining, from the N display surfaces, at least one deformed display surface to which a deformation occurs in the case that an external force is applied to the flexible display;

obtaining at least one deformation parameter of the at least one deformed display surface; and redetermining a display surface for displaying the i-th display object, based on the at least one deformation parameter and at least one position parameter of the at least one deformed display surface.

Optionally, after the display surface for displaying the i-th display object is determined, the method may further include:

obtaining a first preset operation performed on a to-be-controlled display surface of the N display surfaces; and controlling, in response to the first preset operation, the to-be-controlled display surface to switch from a high power consumption state to a low power consumption state, and controlling states of N−1 display surfaces of the N display surfaces other than the to-be-controlled display surface to stay unchanged.

In another aspect, an electronic device including a flexible display capable of having N display surfaces is provided in the disclosure, where N is an integer and N≥2, and the electronic device further includes:

a first obtaining unit, for obtaining N posture parameters of the N display surfaces;

a second obtaining unit, for obtaining an object attribute of an i-th display object among M display objects to be displayed, where M is an integer and M≥1, i is an integer inclusively ranging from 1 to M;

a determining unit, for determining a display surface for displaying the i-th display object from the N display surfaces, based on the N posture parameters and the object attribute; and a display control unit, for displaying the i-th display object on the determined display surface.

Optionally, the determining unit may be for:

determining an i-th display priority of the i-th display object based on the object attribute;

determining N effective display areas of the N display surfaces observed by a user from a first visual angle at a first observation position, based on the N posture parameters;

obtaining, based on the N effective display areas, a first order for arranging the N display surfaces, where an a-th display surface having a maximum effective display area of the N effective display areas is arranged at a first place of the first order and a b-th display surface having a minimum effective display area of the N effective display areas is arranged at an N-th place of the first order; and determining a j-th display surface corresponding to the i-th display priority as the display surface for displaying the i-th display object, based on a correspondence between display priorities and the first order, where j is an integer inclusively ranging from 1 to N.

Optionally, the determining unit may be for:

determining an i-th display priority based on an i-th object type of the i-th display object, in the case that at least two display objects of the M display objects have different object types; or determining the i-th display priority based on display parameters in object attributes, in the case that the M display objects have a same object type.

Optionally, the determining unit may be further for:

determining to display the i-th object on the j-th display surface, where the j-th display surface is arranged at a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, where P and Q are integers.

Optionally, the electronic device may further include:

a detecting unit, for determining, from the N display surfaces, at least one deformed display surface to which a deformation occurs in the case that an external force is applied to the flexible display, after it is determined to display the i-th display object on the j-th display surface; and where the first obtaining unit may be further for obtaining at least one deformation parameter of the at least one deformed display surface; and the determining unit may be further for redetermining a display surface for displaying the i-th display object, based on the at least one deformation parameter and at least one position parameter of the at least one deformed display surface.

Optionally, the electronic device may further include:

a third obtaining unit, for obtaining a first preset operation performed on a to-be-controlled display surface of the N display surfaces; and where the display control unit may be further for controlling, in response to the first preset operation, the to-be-controlled display surface to switch from a high power consumption state to a low power consumption state; and controlling states of N-1 display surfaces of the N display surfaces other than the to-be-controlled display surface to stay unchanged.

In further another aspect, a computer readable storage medium is provided, where computer program instructions are stored in the computer readable storage medium, and the instructions, when being executed by an electronic device with a flexible display which is capable of having N display surfaces, cause the electronic device to perform:

obtaining N posture parameters of the N display surfaces, where N is an integer and N≥2;

obtaining an object attribute of an i-th display object among M display objects to be displayed, where M is an integer and M≥1, i is an integer inclusively ranging from 1 to M;

determining a display surface for displaying the i-th display object from the N display surfaces, based on the N posture parameters and the object attribute; and displaying the i-th display object on the determined display surface.

Optionally, the instructions for said determining a display surface for displaying the i-th display object from the N display surfaces, based on the N posture parameters and the object attribute include instructions which, when being executed by the electronic device, cause the electronic device to perform:

determining, based on the object attribute, an i-th display priority of the i-th display object;

determining, based on the N posture parameters, N effective display areas of the N display surfaces observed by a user from a first visual angle at a first observation position;

obtaining, based on the N effective display areas, a first order for arranging the N display surfaces; where an a-th display surface having a maximum effective display area of the N effective display areas is arranged at a first place of the first order and a b-th display surface having a minimum effective display area of the N effective display areas is arranged at an N-th place of the first order; and determining, based on a correspondence between display priorities and the first order, a j-th display surface corresponding to the i-th display priority as the display surface for displaying the i-th display object, where j is an integer inclusively ranging from 1 to N.

Optionally, the instructions for said determining, based on the object attribute, an i-th display priority of the i-th display object include instructions which, when being executed by the electronic device, cause the electronic device to perform;

determining the i-th display priority based on an i-th object type of the i-th display object, in the case that at least two display objects of the M display objects have different object types; or determining the i-th display priority based on display parameters in object attributes of the M display objects, in the case that the M display objects have a same object type.

Optionally, the instructions for said determining, based on the correspondence between display priorities and the first order, the j-th display surface corresponding to the i-th display priority as the display surface for displaying the i-th display object include instructions which, when being executed by the electronic device, cause the electronic device to perform:

determining to display the i-th display object on the j-th display surface, where the j-th display surface is arranged at a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, where P and Q are integers.

Optionally, the computer readable storage medium further has stored therein instructions which are executed by the electronic device after said determining to display the i-th display object on the j-th display surface and cause the electronic device to perform:

determining, from the N display surfaces, at least one deformed display surface to which a deformation occurs in the case that an external force is applied to the flexible display;

obtaining at least one deformation parameter of the at least one deformed display surface; and redetermining a display surface for displaying the i-th display object, based on the at least one deformation parameter and at least one position parameter of the at least one deformed display surface.

Optionally, the computer readable storage medium further has stored therein instructions which are executed by the electronic device after the display surface for displaying the i-th display object is determined and cause the electronic device to perform:

obtaining a first preset operation performed on a to-be-controlled display surface of the N display surfaces; and controlling, in response to the first preset operation, the to-be-controlled display surface to switch from a high power consumption state to a low power consumption state, and controlling states of N-1 display surfaces of the N display surfaces other than the to-be-controlled display surface to stay unchanged.

DETAILED DESCRIPTION

An information processing method and an electronic device are provided in the disclosure, to solve a technical problem in the conventional technology that different objects can not be displayed on multiple display surfaces of a flexible display, and a display surface for displaying an display object is determined based on posture parameters of the display surfaces and an attribute of the display object.

To solve the above technical problem, a technical solution having the following general idea is provided by the disclosure.

In the technical solution of the disclosure, N posture parameters of N display surfaces are obtained; an object attribute of an i-th display object of M display objects to be displayed is obtained, where M is an integer equal to or greater than 1, and i is an integer inclusively ranging from 1 to M; a display surface for displaying the i-th display object is determined from the N display surfaces based on the N posture parameters and the object attribute; and the i-th display object is displayed on the determined display surface. Hence, the technical problem in the conventional technology that different objects can not be displayed on multiple display surfaces of the flexible display is solved, display surfaces for the display objects are determined based on the posture parameters of the display surfaces and the attributes of the display objects, and contents which are not identical are displayed on the N display surfaces.

To make the objects, technical solutions and advantages of embodiments of the disclosure more clear, hereinafter the technical solutions of the embodiments of the disclosure are described clearly and completely in conjunction with drawings of the embodiments of the disclosure. Apparently, the described embodiments are only some embodiments of the disclosure, but not all the embodiments. Any other embodiments obtained by those skilled in the art without any creative work fall within the scope of protection of the disclosure.

Herein a term "and/or" only describes an association between associated objects, and may indicate three types of relation. For example, A and/or B may indicate that: there is only A, there is both A and B, or there is only B. In addition, herein a character "/" generally indicates a relation of "or" between associated objects before and after the character.

A First Embodiment

Figure 1:
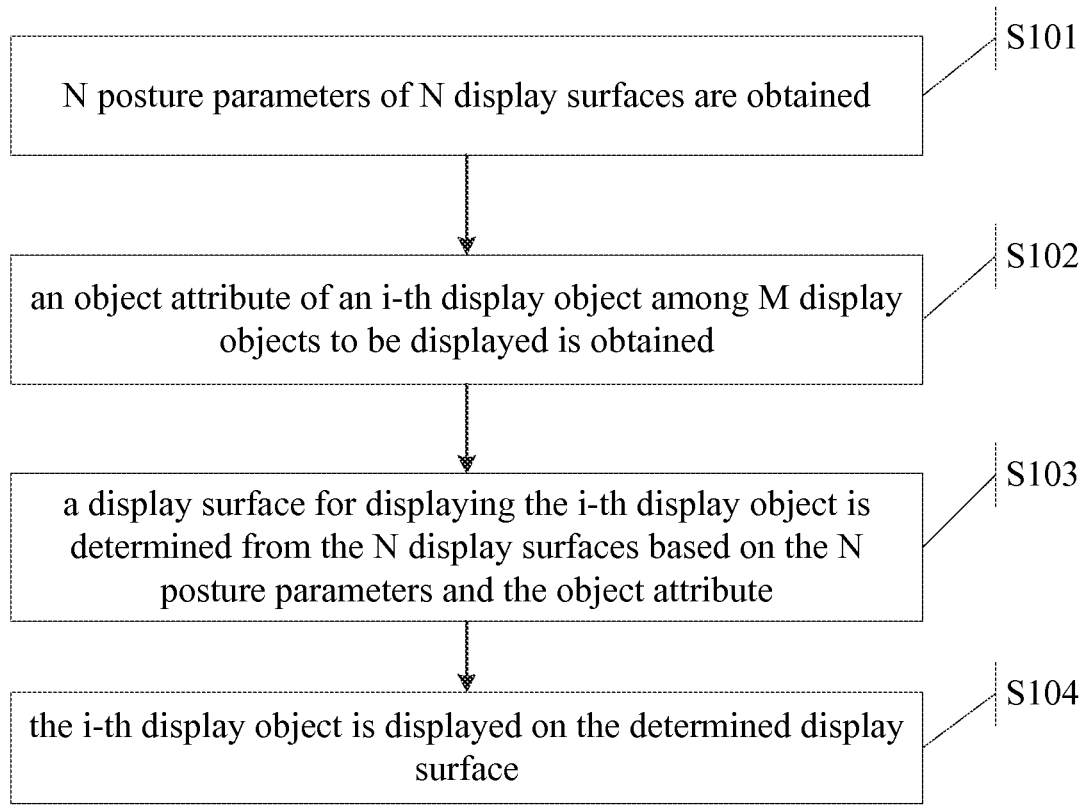
FIG. 1 is a flowchart of an information processing method according to an embodiment of the disclosure.

An information processing method is provided according to the disclosure. As shown in FIG. 1, the method includes the following steps S101 to S104.

In step S101, N posture parameters of N display surfaces are obtained.

In step S102, an object attribute of an i-th display object among M display objects to be displayed is obtained.

In step S103, a display surface for displaying the i-th display object is determined from the N display surfaces based on the N posture parameters and the object attribute.

In step S104, the i-th display object is displayed on the determined display surface for displaying the i-th display object.

Firstly, in the embodiment of the disclosure, an electronic device has a flexible display, and the flexible display can be folded and bent, thereby presenting N display surfaces. N is an integer and N≥2, and a specific value of N is not limited in the disclosure.

Figure 2:
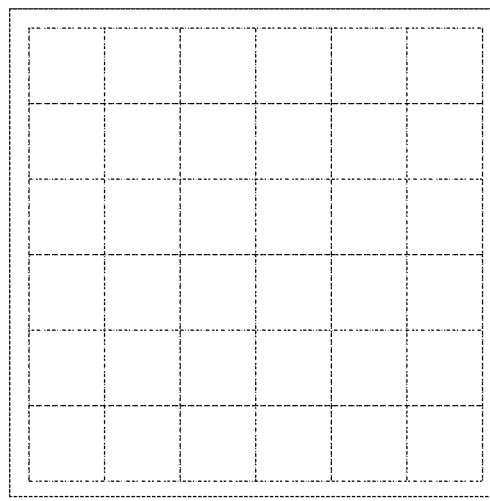
FIG. 2 is a schematic diagram for obtaining N posture parameters according to an embodiment of the disclosure.
Figure 3A:
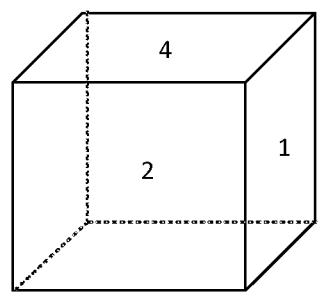
FIG. 3a to FIG. 3c are schematic diagrams of N display surfaces of a flexible display according to an embodiment of the disclosure.
Figure 3B:
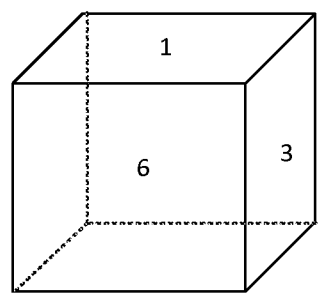
Figure 3C:
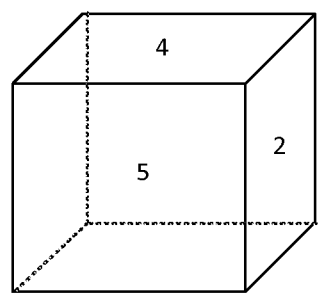

In step S101, the N posture parameters of the N display surfaces may be obtained in various ways. For example, in a first way, a gravity sensing matrix may be provided within the flexible display. Supposing that FIG. 2 shows a flexible display which is not bent, one gravity sensor may be provided at each intersection or in each small square of the dotted line matrix grid. In the case that the flexible display is bent to present N display surfaces, a gravity is detected by the gravity sensor(s) in each display surface, and a processor can calculate N posture parameters of the respective display surfaces based on the values and directions of the gravitys detected by the gravity sensors. In practic implemention, the denser the matrix grid is and the more the gravity sensors are provided, the more accurate the posture parameters are, which may be set by those skilled in the art according practically.

In a second way, multiple current images of the flexible display may be shot by a camera connected to the electronic device or other electronic apparatus, and posture parameters of the N display surfaces are calculated based on gray levels of the respective surfaces in the current images; specific calculation ways are similar to that in the conventional technology and are not described here.

In practic implemention, the posture parameter includes but is not limited to a display region area of each display surface, an angle between each display surface and the ground, and a position of each display surface with respect to a reference point.

In the case that the flexible display has N display surfaces, M display objects may be displayed on the N display surfaces by the electronic device in the embodiment of the disclosure, and contents are displayed on the N display surfaces are not identical. For the convenience of illustration, hereinafter it is introduced by taking one display object as an example. In practic implemention, other M-1 display objects may be processed similarly.

Firstly, in step S102, an object attribute of the i-th display object is obtained, where M is an integer and M≥1, and i is an integer inclusively ranging from 1 to M. The object attribute includes but is not limited to an object type such as a picture or a text, a display size, and a display priority and so on. The electronic device may read the object attribute of the i-th display object directly from a memory, a video memory or a storage region. Practically, object attributes of other M-1 display objects are also to be obtained in addition to the object attribute of the i-th display object. Obtainings of the object attributes of the other M-1 display objects are similar to the obtaining of the i-th display object.

Subsequently, in step S103, a display surface for displaying the i-th display object is determined based on the N posture parameters and the object attribute of the i-th display object. In an embodiment of the disclosure, determining the display surface for displaying the i-th display object from the N display surfaces may include the following step (11) to step (14).

In step (11), an i-th display priority of the i-th display object is determined based on the object attribute of the i-th display object.

In step (12), N effective display areas of the N display surfaces observed by a user from a first visual angle at a first observation position are determined based on the N posture parameters.

In step (13), a first order for arranging the N display surfaces is obtained based on the N effective display areas, where an a-th display surface having the maximum effective display area of the N effective display areas is arranged as the first place of the first order and a b-th display surface having the minimum effective display area of the N effective display areas is arranged as the N-th place of the first order.

In step (14), a j-th display surface corresponding to the i-th display priority is determined as the display surface for displaying the i-th display object, based on a correspondence between display priorities and the first order, where j is an integer inclusively ranging from 1 to N.

Optionally, in an embodiment of the disclosure, step (11) may include:

obtaining the i-th display priority based on an i-th object type of the i-th display object, in the case that at least two display objects of the M display objects have different object types; or determining the i-th display priority based on display parameters in the object attributes in the case that the M display objects have a same object type.

Specifically, the M display objects may have the same object type, for example the M display objects are M images; or the M display objects may have different object types, for example, 5 display objects include 3 image objects and 2 video objects. Whether the M display objects have the same object type is not limited in the disclosure.

In the case that at least two display objects of the M display objects have different object types, the i-th priority is obtained based on the i-th object type of the i-th display object. Specifically, default priorities for different object types are stored in the electronic device. Practically, the user may preset a priority for each object type in the electronic device according to needs.

For example, it is assumed that currently in the electronic device, the priorities of object types of a video dialogue, a video, a picture and a desktop tool are in a descending order. If the i-th display object is a video dialogue request, it may be known from the priorities set in the electronic device that the i-th priority of the i-th display object is a highest priority Practically, in practic implemention, object types and the specific priority order include but is not limited to the above example, which may be set by those skilled in the art according to actual cases.

In the case that the M display objects have the same object type, priorities for the respective display objects are determined based on display parameters rather than the object type. In the embodiment of the disclosure, the display parameter includes but is not limited to a display size, a resolution and a definition. In the electronic device, priorities may be set based on one kind of parameter in the display parameter, for example, the larger the display size is, the higher the priority is. Alternatively, a weight may be set for each kind of parameter in the display parameter and the priority of the display object is determined by calculating weighted values of the respective display parameters.

For example, it is assumed that M is 3; for a first display object, a display size is 3×5, and a resolution is 800×600; for a second display object, a display size is 4×6, a resolution is 1024×768; and for a third display object, a display size is 5×7, and a resolution is 1024×768. For facilitating calculating, it is assumed that the display size 3×5 corresponds to 1, the display size 4×6 corresponds to 2, the display size 5×7 corresponds to 3, the resolution 800×600 corresponds to 1, the resolution 1024×768 corresponds to 2, and currently a weight of the display size is 2 and a weight of the resolution is 1. Consequently, the weighted value of the first display object is 2×1+1×1, i.e., 3. Similarly, the weighted value of the second display object is 6, and the weighted value of the third display object is 8. Therefore, the above three display objects are ordered as the third display object, the second display object and the first display object based on a descending order of the priorities.

Subsequently, in step (12), N effective display areas of the N display surfaces are determined. Specifically, in the case that the user observes with a first visual angle at a first observation position, the user may see respective display surfaces with different areas since the N display surfaces may be toward different directions. The electronic device firstly acquires an image of the user via a camera of the electronic device, analyzes to obtain a position of eyes of the user from the image, and then determines the position of the eyes as the first observation position.

Figure 4:
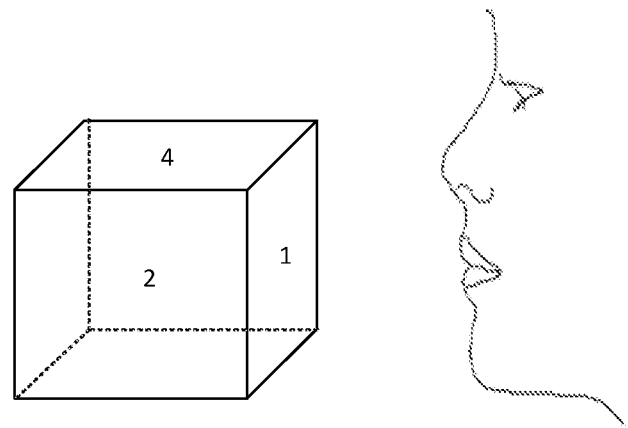
FIG. 4 is a schematic diagram of a first observation position according to an embodiment of the disclosure.

For convenience of illustration, reference is made to FIG. 3a, FIG. 3b, FIG. 3c and FIG. 4. It is assumed that the flexible display is bent to form a shape similar to a cuboid, in this case N is 6; and it is assumed that the first observation position of the user is right ahead of a first display surface, as shown in FIG. 4. Since the first observation position is right ahead of the first display surface, the user can see the whole region of the first display surface; here it is assumed that a first effective display area of the first display surface is S. A second display surface and a third display surface are located at the left side and the right side of the first display surface and the user can only see a part of each of the second display surface and the third display surface. It is calculated that a second effective display area of the second display surface and a third effective display surface of the third display surface each are 0.4S. A fourth effective display area of the fourth display surface is 0.8S. In addition, a fifth display surface is opposite to the first display surface and a sixth display surface is the bottom surface and may contact a surface where the flexible display is placed; hence, a fifth effective display area and a sixth effective display area each are 0.

In specific implemention, the position of eyes of the user, a distance from the user to the electronic device and an angle between the user and the electronic device can be obtained by analyzing the image of the user, and the analyzing approaches are disclosed in the conventional field of image processing, which are not described here.

After the N effective display areas are obtained, in step (13), the N display surfaces are listed in a first order based on the N effective display areas. Specifically, in the embodiment of the disclosure, the N effective display areas are listed in a descending order and an order of the N display surfaces respectively corresponding to the listed N effective display areas is the first order. In other words, an a-th display surface having the maximum effective display area of the N effective display areas is arranged at a first place of the first order; and a b-th display surface having the minimum effective display area of the N effective display areas is arranged at an N-th place of the first order.

The above example is applied here again, i.e., the first effective display area is S, the second effective display area and the third effective display area each are 0.4S, the fourth effective display area is 0.8S, and the fifth effective display area and the sixth effective display area each are 0. Hence, in the first order, the six display surfaces are listed sequentially as follows:
the first display surface,
the fourth display surface,
the second display surface, the third display surface, and
the fifth display surface, the sixth display surface.

In the first order, the second display surface and the third display surface are tied for a third place, and the fifth display surface and the sixth display surface are tied for a fourth place.

Lastly, in step (14), a j-th display surface of the N listed display surfaces corresponding to the i-th display priority is determined based on a correspondence between display priorities and the first order, and the i-th display object is displayed on the j-th display surface. The j-th display surface is the display surface for displaying the i-th display object. Here j is an integer inclusively ranging from 1 to N.

Optionally, in an embodiment of the disclosure, step (14) may include:
determining to display the i-th display object on the j-th display surface, where the j-th display surface is arranged at a j-th place of the first order, P display objects with priorities higher than the i-th priority are displayed on j−1 display surfaces which are arranged at a first place to a (j−1)-th place of the first order, and Q display objects with priorities less than the i-th display priority are displayed on N-j display surfaces which are arranged at a (j+1)-th place to an N-th place of the first order; where P and Q are integers.

Specifically, after the first order of the N display surfaces and display priorities of the M display objects are obtained, a display surface for displaying each object is determined based on the correspondence between the first order and the display priorities, thereby determining the display surface for displaying the i-th display object. In the embodiment of the disclosure, if N≥M, the M display objects respectively correspond to display surfaces arranged at the first M places in the first order, based on the display priorities; if N<M, for the M display objects, a first part of display objects correspond to a display surface arranged at the first place of the first order, a second part of display objects correspond to a display surface arranged at the second place of the first order, and similarly, an N-th part of display objects correspond to a display surface arranged at an N-th place of the first order. Display priorities of the first part of display objects each are higher than display priorities of the second part of display objects, display priorities of the second part of display objects each are higher than display priorities of a third part of display objects, and similarly, display priorities of an (N−1)-th part of display objects each are higher than display priorities of the N-th part of display objects. In addition, the numbers of display objects included in different parts of display objects may be the same or different.

For example, it is assumed that M is 5, and the 5 display objects sequentially are a video dialogue, a movie, a picture 1, a picture 2 and a clock according to an order of display priorities. Reference is made to FIG. 4 and the above example is applied here again, it is assumed that the first order is an order listed as the first display surface, the fourth display surface, the second display surface, the third display surface, the fifth display surface and the sixth display surface. Accordingly, the correspondence between the display priorities and the first order is that: the video dialogue corresponds to the first display surface, the movie corresponds to the second display surface, the picture 1 corresponds to the third display surface, the picture 2 corresponds to the fourth display surface, and the clock corresponds to the fifth display surface.

In the case that the i-th display object is the video dialogue, it is determined to display the i-th display object on the first display surface and to display other display objects with priorities lower than the i-th display priority on other 5 display surfaces arranged after the first place of the first order.

In step S104, the i-th display object is displayed on the determined display surface for displaying the i-th display object.

Optionally, effective display areas of some display surfaces are 0, i.e., the user can not see display objects displayed on the display surfaces of which the effective display areas are 0 at the first observation position. Hence, in practic implemention, the display objects corresponding to the display surfaces of which the effective display areas are 0 may be displayed on a display surface of which the effective display area is not 0. In the above example, the clock corresponding to the fifth display surface may be displayed on the fourth display surface.

Optionally, after step S104, the method may further include:

determining, from the N display surfaces, at least one deformed display surface to which a deformation occurs in the case that an external force is applied to the flexible display;

obtaining at least one deformation parameter of the at least one deformed display surface; and redetermining a new display surface for actually displaying the i-th display object based on the at least one deformation parameter and at least one position parameter of the at least one deformed display surface.

Specifically, the flexible display may be bent and folded, and the user may bend the flexible display after the i-th display object is displayed on the determined display surface. Hence, firstly at least one deformed display surface to which a deformation occurs is determined from the N display surfaces in the case that an external force is applied to the flexible display.

In the embodiment of the disclosure, a point at which the external force is applied may be detected by a pressure sensor connected to the flexible display, a display surface where the point is located is further obtained by analyzing, thereby detecting at least one deformed display surface. In addition, posture parameters of the N display surfaces may be obtained by detecting periodically for example every 5 seconds, and at least one display surface whose posture parameter is changed when compared with the posture parameter detected in a previous period is determined as the at least one deformed display surface. The ways for detecting the posture parameters may be understood with reference to the above description, which are not described here.

Subsequently, at least one deformation parameter of the at least one deformed display surface is obtained. Specifically, each of the at least one deformation parameter includes but not is limited to an external force applying point, a magnitude of the external force, a function of a tangent plane of a deformation region, and a curvature of the deformation region and so on.

Subsequently, a display surface for displaying the i-th display object is redetermined based on the at least one deformation parameter and at least one position parameter of the at least one deformed display surface.

Figure 5A:
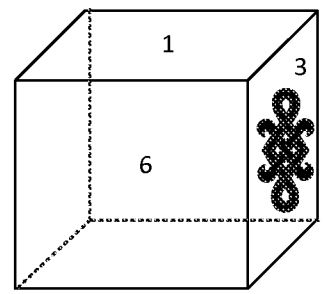
FIG. 5a to FIG. 5b are schematic diagrams showing a deformed display surface and switching between two display surfaces according to an embodiment of the disclosure.
Figure 5B:
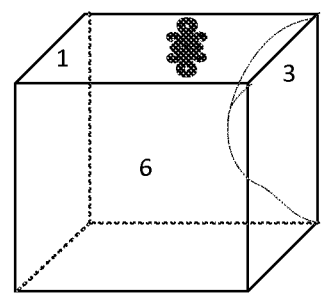

To illustrate clearly, reference is made to FIG. 5a. It is assumed a picture is displayed on the third display surface. The user bends the third display surface inwardly, resulting in that the third display surface is sheltered by the first display surface. To watch the picture by the user, as shown in FIG. 5b, the picture is redisplayed on a display surface adjacent to the third display surface, for example, on the first display surface, based on the position parameter of the third display surface.

By displaying the display object originally displayed on the at least one deformed display surface on another display surface, in one aspect, the user can see the display object which is displayed on the at least one deformed display surface before the deformation occurs; and in another aspect, the user sees the display object switches to another display surface due to the deformation during a bending process, thereby improving the user experience.

Optionally, after step S104, the method may further include:

obtaining a first preset operation performed on a to-be-controlled display surface of the N display surfaces; and controlling, in response to the first preset operation, the to-be-controlled display surface to switch from a high power consumption state to a low power consumption state; and controlling states of N-1 display surfaces of the N display surfaces other than the to-be-controlled display surface to stay unchanged.

Specifically, a first preset operation performed on the to-be-controlled display surface of the N display surfaces is obtained firstly. The first preset operation may be obtained by a pressure sensor. Or the first preset operation may be obtained through a direct touch in the case that the flexible display has a touch function.

After the first preset operation is obtained, in response to the first preset operation, the to-be-controlled display surface is adjusted from a high power consumption state to a low power consumption state, while original states of other N-1 display surfaces are controlled to keep unchanged.

For example, the user clicks on the first display surface in FIG. 4, the electronic device, in response to the first preset operation, adjusts a state of the first display surface to the low power consumption state and keeps original states of other 5 display surfaces unchanged, where each of the original states of other 5 display surfaces is the high power consumption state or the low power consumption state, and here the first preset operation is the click operation.

In the conventional technology, the whole flexible display is in the high power consumption state or the low power consumption state, which may results in a high power consumption of the flexible display or the user can only adjust the state of the whole flexible display to the low power consumption state; hence, is it not convenient to use. With the technical solution of the embodiment of the disclosure, the to-be-controlled display surface is adjusted from the high power consumption state to the low power consumption state and states of other display surfaces are kept unchanged, thereby reducing the power consumption of the device and causing no influence on the displaying of other display surfaces.

A Second Embodiment

Figure 6:
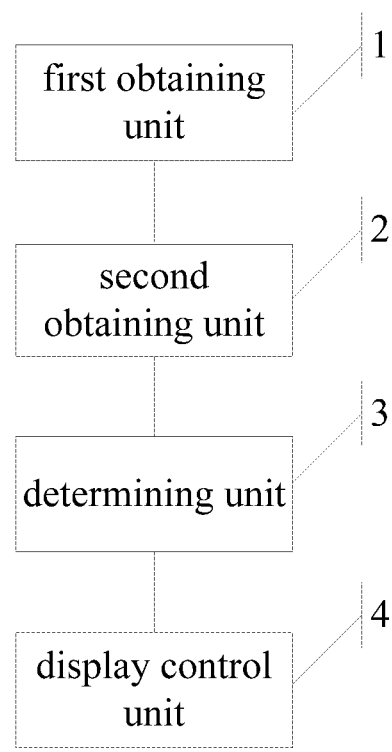
FIG. 6 is a schematic structural diagram of an electronic device according to an embodiment of the disclosure.

An electronic device including a flexible display is provided according to the disclosure, where the flexible display is capable of having N display surfaces, where N is an integer equal to or greater than 2. As shown in FIG. 6, the electronic device according to an embodiment of the disclosure further includes a first obtaining unit 1, a second obtaining unit 2, a determining unit 3 and a display control unit 4.

The first obtaining unit 1 is configured to obtain N attitude parameters of the N display surfaces.

The second obtaining unit 2 is configured to obtain an object attribute of an i-th display object among M display objects to be displayed, where M is an integer and M≥1, and i is an integer inclusively ranging from 1 to M.

The determining unit 3 is configured to determine a display surface for displaying the i-th display object from the N display surfaces based on the N posture parameters and the object attribute.

The display control unit 4 is configured to display the i-th display object on the determined display surface.

Optionally, the determining unit 3 may be configured to:

determine an i-th display priority of the i-th display object based on the object attribute;

determine N effective display areas of the N display surfaces observed by a user from a first visual angle at a first observation position, based on the N posture parameters;

obtain, based on the N effective display areas, a first order for arranging the N display surfaces, where an a-th display surface having the maximum effective display area of the N effective display areas is arranged as a first place of the first order and a b-th display surface having the minimum effective display area of the N effective display areas is arranged as an N-th place of the first order; and determine a j-th display surface corresponding to the i-th display priority as the display surface for displaying the i-th display object, based on a correspondence between display priorities and the first order, where j is an integer inclusively ranging from 1 to N.

In the embodiment of the disclosure, the determining unit 3 may be configured to:

determine the i-th display priority based on an i-th object type of the i-th display object, in the case that at least two display objects of the M display objects have different object types; or determine the i-th display priority based on display parameters in the object attributes, in the case that the M display objects has a same object type.

Furthermore, the determining unit 3 may be further configured to:

determine to display the i-th display object on a j-th display surface, where the j-th display surface is arranged as a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, where P and Q are integers.

Optionally, the electronic device according to the embodiment of the disclosure may further include:

a detecting unit configured to determine, from the N display surfaces, at least one deformed display surface to which a deformation occurs in the case that an external force is applied to the flexible display, after it is determined to display the i-th display object on the j-th display surface.

The first obtaining unit 1 is further configured to obtain at least one deformation parameter of the at least one deformed display surface.

The determining unit 3 is further configured to redetermine a display surface for displaying the i-th display object, based on the at least one deformation parameter and at least one position parameter of the at least one deformed display surface.

Optionally, the electronic device according to the embodiment of the disclosure may further include:

a third obtaining unit, configured to obtain a first preset operation performed on a to-be-controlled display surface of the N display surfaces.

The display control unit 4 is further configured to control, in response to the first preset operation, the to-be-controlled display surface to switch from a high power consumption state to a low power consumption state and to control states of N-1 display surfaces of the N display surfaces other than the to-be-controlled display surface to stay unchanged.

With one or more of the above technical solutions of the embodiments of the disclosure, one or more of the following technical effects may be achieved.

In the technical solutions of the disclosure, N posture parameters of the N display surfaces are obtained; the object attribute of the i-th display object of M display objects to be displayed is obtained, where M is an integer equal to or greater than 1, and i is an integer inclusively ranging from 1 to M; a display surface for displaying the i-th display object is determined from the N display surfaces based on the N posture parameters and the object attribute; and the i-th display object is displayed on the display surface. Therefore, the technical problem in the conventional technology that different objects can not be displayed on multiple display surfaces of the flexible display is solved, the display surfaces for displaying the display objects are determined based on the posture parameters of the display surfaces and the attributes of the display objects, and contents which are not identical are displayed on the N display surfaces.

Those skilled in the art should understand that the embodiments of the disclosure may be embodied as a method, a system or a computer program product. Hence, in the disclosure, the embodiments may be complete hardware-based, complete software-based, or a combination of software and hardware. In addition, the disclosure may be embodied as computer program products implemented on one or multiple computer available storage medium storing computer available computer codes (include but is not limited to a magnetic disc memory, a CD-ROM, and an optical memory).

The disclosure is described with reference to flowcharts and/or block diagrams of the method, device (system) and computer program products according to the embodiments of the disclosure. It should be understood that each flow and/or block and a combination of flows and/or blocks in the flowcharts and/or block diagrams may be implemented by computer program instructions. These computer program instructions may be provided to a general-purpose computer, a private computer, an embedded processor or processors of other programmable data processing devices to generate a machine, such that an apparatus for implementing functions specified in one or multiple flows in the flowcharts and/or one or multiple blocks in the block diagrams is generated based on instructions executed by the computer or processors of other programmable data processing devices.

These computer program instructions may be stored in a computer readable memory which can guide the computer or other programmable data processing devices to work in a certain way, such that instructions stored in the computer readable memory generate a product including an instruction apparatus which achieves functions specified in one or multiple flows in the flowcharts and/or one or multiple blocks in the block diagrams.

These computer instructions may also be loaded to the computer or other programmable processing devices, such that a series of operations are performed on the computer or other programmable devices to generate the processing implemented by the computer, and instructions executed on the computer or other programmable devices may provide operations for implementing functions specified in one or multiple flows in the flowcharts and/or one or multiple blocks in the block diagrams.

Specifically, computer program instructions corresponding to the information processing method according to the embodiment of the disclosure may be stored in a compact disc, a hard disc or a USB flash disc and so on. The computer program instructions corresponding to the information processing method stored in the storage medium, when being read or executed by an electronic device, include:

obtaining N posture parameters of N display surfaces;

obtaining an object attribute of an i-th display object of M display objects to be displayed, where M is an integer equal to or greater than 1, and i is an integer inclusively ranging from 1 to M;

determining, based on the N posture parameters and the object attribute, a display surface for displaying the i-th display object from the N display surfaces; and displaying the i-th display object on the determined display surface.

Optionally, computer instructions which correspond to the process of determining, based on the N posture parameters and the object attribute, a display surface for displaying the i-th display object from the N display surfaces and are stored in the storage medium, when being executed, include:

determining, based on the object attribute, an i-th display priority of the i-th display object;

determining, based on the N posture parameters, N effective display areas of the N display surfaces observed by a user from a first visual angle at a first watching position;

obtaining, based on the N effective display areas, a first order for arranging the N display surfaces, where an a-th display surface having the maximum effective display area of the N effective display areas is arranged at a first place of the first order and a b-th display surface having the minimum effective display area of the N effective display areas is arranged at an N-th place of the first order; and determining, based on a correspondence between display priorities and the first order, a j-th display surface corresponding to the i-th display priority as the display surface for displaying the i-th display object, where j is an integer inclusively ranging from 1 to N.

Optionally, computer instructions which correspond to the process of determining, based on the object attribute, an i-th display priority of the i-th display object and are stored in the storage medium, when being executed, include:

determining the i-th display priority based on an i-th object type of the i-th display object, in the case that at least two display objects of the M display objects have different object types; or determining the i-th display priority based on display parameters in the object attributes, in the case that the M display objects have a same object type.

Optionally, computer instructions which correspond to the process of determining, based on a correspondence between display priorities and the first order, a j-th display surface corresponding to the i-th display priority as the display surface for displaying the i-th display object and are stored in the storage medium, when being executed, include:

determining to display the i-th display object on the j-th display surface, where the j-th display surface is arranged at a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, where P and Q are integers.

Optionally, other computer instructions are stored in the storage medium, and these computer instructions are executed after the process of determining to display the i-th display object on the j-th display surface and, when being executed, include:

determining, from the N display surfaces, at least one deformed display surface to which a deformation occurs in the case that an external force is applied to the flexible display;

obtaining at least one deformation parameter of the at least one deformed display surface; and redetermining a display surface for displaying the i-th display object, based on the at least one deformation parameter and at least one position parameter of the at least one deformed display surface.

Optionally, still other computer instructions are stored in the storage medium, and these computer instructions are executed after the process of determining to display the i-th display object on the display surface and, when being executed, include:

obtaining a first preset operation performed on a to-be-controlled display surface of the N display surfaces; and controlling, in response to the first preset operation, the to-be-controlled display surface to switch from a high power consumption state to a low power consumption state; and controlling states of N-1 display surfaces of the N display surfaces other than the to-be-controlled display surface to stay unchanged.

Apparently, those skilled in the art may make many changes and variations to the disclosure without departing from the spirit and scope of the disclosure. If these changes and variations made to the disclosure fall within the scope of claims of the disclosure and equivalent technologies thereof, the disclosure is intended to include these changes and variations.

The invention claimed is:

1. An information processing method, which is applied to an electronic device having a flexible display, wherein the flexible display is capable of having N display surfaces, N is an integer and N≥2, the method comprising:

obtaining N posture parameters of the N display surfaces;

obtaining an object attribute of an i-th display object among M display objects to be displayed, wherein M is an integer and M≥1, i is an integer inclusively ranging from 1 to M;

determining a display surface for displaying the i-th display object from the N display surfaces based on the N posture parameters and the object attribute;

displaying the i-th display object on the determined display surface;

obtaining a first preset operation performed on a to-be-controlled display surface of the N display surfaces;

controlling, in response to the first preset operation, the to-be-controlled display surface to switch from a high power consumption state to a low power consumption state; and controlling states of N−1 display surfaces of the N display surfaces other than the to-be-controlled display surface to stay unchanged;

wherein the determining a display surface for displaying the i-th display object from the N display surfaces based on the N posture parameters and the object attribute comprises;

determining, based on the object attribute, an i-th display priority of the i-th display object;

determining, based on the N posture parameters, N effective display areas of the N display surfaces observed by a user from a first visual angle at a first observation position:

obtaining, based on the N effective display areas, a first order for arranging the N display surfaces: wherein an a-th display surface having a maximum effective display area of the N effective display areas is arranged at a first place of the first order and a b-th display surface having a minimum effective display area of the N effective display areas is arranged at an N-th place of the first order; and determining, based on a correspondence between display priorities and the first order, a i-th display surface corresponding to the i-th display priority as the display surface for displaying the i-th display object, wherein j is an integer inclusively ranging from 1 to N.

2. The method according to claim 1, wherein said determining, based on the object attribute, an i-th display priority of the i-th display object comprises:
    determining the i-th display priority based on an i-th object type of the i-th display object when at least two display objects of the M display objects have different object types; or
    determining the i-th display priority based on display parameters in object attributes of the M display objects when the M display objects have a same object type.

3. The method according to claim 1, wherein said determining, based on the correspondence between display priorities and the first order, the j-th display surface corresponding to the i-th display priority as the display surface for displaying the i-th display object comprises:
    determining to display the i-th display object on the j-th display surface, wherein the j-th display surface is arranged at a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, wherein P and Q are integers.

4. The method according to claim 3, wherein after said determining to display the i-th display object on the j-th display surface, the method further comprises:
    determining, from the N display surfaces, at least one deformed display surface to which a deformation occurs when an external force is applied to the flexible display;
    obtaining at least one deformation parameter of the at least one deformed display surface; and
    redetermining a display surface for displaying the i-th display object, based on the at least one deformation parameter and at least one position parameter of the at least one deformed display surface.

5. An electronic device comprising:
    a flexible display capable of having N display surfaces, wherein N is an integer and N≥2;
    a processor; and
    a computer readable storage medium having stored therein computer program instructions, wherein, the computer program instructions, when executed by the processor, cause the electronic device to:
    obtain N posture parameters of the N display surfaces;
    obtain an object attribute of an i-th display object among M display objects to be displayed, wherein M is an integer and M≥1, i is an integer inclusively ranging from 1 to M;
    determine a display surface for displaying the i-th display object from the N display surfaces based on the N posture parameters and the object attribute;
    display the i-th display object on the determined display surface;
    obtain a first preset operation performed on a to-be-controlled display surface of the N display surfaces; and
    control, in response to the first preset operation, the to-be-controlled display surface to switch from a high power consumption state to a low power consumption state, and control states of N−1 display surfaces of the N display surfaces other than the to-be-controlled display surface to stay unchanged;
    wherein the determine a display surface for displaying the i-th display object from the N display surfaces based on the N posture parameters and the object attribute comprises:
    determine an i-th display priority of the i-th display object based on the object attribute;
    determine N effective display areas of the N display surfaces observed by a user from a first visual an le at a first observation position, based on the N posture parameters;
    obtain, based on the N effective display areas, a first order for arranging the N display surfaces, wherein an a-th display surface having a maximum effective display area of the N effective display areas is arranged at a first place of the first order and a b-th display surface having a minimum effective display area of the N effective display areas is arranged at an N-th place of the first order; and
    determine, a i-th display surface corresponding to the i-th display priority as the display surface for displaying the i-th display object, based on a correspondence between display priorities and the first order, wherein i is an integer inclusively ranging from 1 to N.

6. The electronic device according to claim 5, wherein the computer program instructions, when executed by the processor, cause the electronic device to:
    determine an i-th display priority based on an i-th object type of the i-th display object when at least two display objects of the M display objects have different object types; or
    determine the i-th display priority based on display parameters in object attributes when the M display objects have a same object type.

7. The electronic device according to claim 5, wherein the determine the i-th display surface corresponding to the i-th display priority as the display surface for displaying the i-th display object, based on the correspondence between display priorities and the first order comprises;
    determine to display the i-th display object on the j-th display surface, wherein the j-th display surface is arranged at a j-th place of a first order, P display objects with priorities higher than an i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, wherein P and Q are integers.

8. The electronic device according to claim 7, wherein, the computer program instructions, when executed by the processor, further cause the electronic device to:
    determine, from the N display surfaces, at least one deformed display surface to which a deformation occurs when an external force is applied to the flexible display, after it is determined to display the i-th display object on the j-th display surface; and
    obtain at least one deformation parameter of the at least one deformed display surface; and
    redetermine a display surface for displaying the i-th display object, based on the at least one deformation parameter and at least one position parameter of the at least one deformed display surface.

9. A non-transitory computer readable storage medium having stored therein computer program instructions which, when being executed by an electronic device with a flexible display which is capable of having N display surfaces, cause the electronic device to perform:

obtaining N posture parameters of the N display surfaces, wherein N is an integer and N≥2;

obtaining an object attribute of an i-th display object among M display objects to be displayed, wherein M is an integer and M≥1, i is an integer inclusively ranging from 1 to M;

determining a display surface for displaying the i-th display object from the N display surfaces based on the N posture parameters and the object attribute;

displaying the i-th display object on the determined display surface;

obtaining a first preset operation performed on a to-be-controlled display surface of the N display surfaces; and controlling, in response to the first preset operation, the to-be-controlled display surface to switch from a high power consumption state to a low power consumption state, and controlling states of N−1 display surfaces of the N display surfaces other than the to-be-controlled display surface to stay unchanged;

wherein the computer program instructions for the determining a display surface for displaying the i-th display object from the N display surfaces based on the N posture parameters and the object attribute comprise instructions which, when being executed by the electronic device, cause the electronic device to perform:

determining, based on the object attribute, an i-th display priority of the i-th display object;

determining, based on the N posture parameters, N effective display areas of the N display surfaces observed by a user from a first visual angle at a first observation position;

obtaining, based on the N effective display areas, a first order for arranging the N display surfaces, wherein an a-th display surface having a maximum effective display area of the N effective display areas is arranged at a first place of the first order and a b-th display surface having a minimum effective display area of the N effective display areas is arranged at an N-th place of the first order; and determining, based on a correspondence between display priorities and the first order, a j-th display surface corresponding to the i-th display priority as the display surface for displaying the i-th display object, wherein i is an integer inclusively ranging from1 to N.

10. The non-transitory computer readable storage medium according to claim 9, wherein the instructions for said determining, based on the object attribute, an i-th display priority of the i-th display object comprise instructions which, when being executed by the electronic device, cause the electronic device to perform:

determining the i-th display priority based on an i-th object type of the i-th display object when at least two display objects of the M display objects have different object types; or determining the i-th display priority based on display parameters in object attributes of the M display objects when the M display objects have a same object type.

11. The non-transitory computer readable storage medium according to claim 9, wherein the instructions for said determining, based on the correspondence between display priorities and the first order, the j-th display surface corresponding to the i-th display priority as the display surface for displaying the i-th display object comprise instructions which, when being executed by the electronic device, cause the electronic device to perform:

determining to display the i-th display object on the j-th display surface, wherein the j-th display surface is arranged at a j-th place of the first order, P display objects with priorities higher than the i-th display priority are displayed on j−1 display surfaces which are arranged at a first place to a (j−1)-th place of the first order, and Q display objects with priorities lower than the i-th display priority are displayed on N-j display surfaces which are arranged at a (j+1)-th place to an N-th place of the first order, wherein P and Q are integers.

12. The non-transitory computer readable storage medium according to claim 11, further having stored therein instructions which are executed by the electronic device after said determining to display the i-th display object on the j-th display surface and cause the electronic device to perform:

determining, from the N display surfaces, at least one deformed display surface to which a deformation occurs when an external force is applied to the flexible display;

obtaining at least one deformation parameter of the at least one deformed display surface; and redetermining a display surface for displaying the i-th display object, based on the at least one deformation parameter and at least one position parameter of the at least one deformed display surface.

* * * * *